(12) United States Patent
Kallio

(10) Patent No.: US 8,019,335 B2
(45) Date of Patent: Sep. 13, 2011

(54) IDENTIFYING NEIGHBORING CELLS IN TELECOMMUNICATION NETWORK

(75) Inventor: Janne Kallio, Pattiioki (FI)

(73) Assignee: Nokia Corporation, Espoo (FI)

( * ) Notice: Subject to any disclaimer, the term of this patent is extended or adjusted under 35 U.S.C. 154(b) by 567 days.

(21) Appl. No.: 09/770,491

(22) Filed: Jan. 29, 2001

(65) Prior Publication Data

US 2002/0147008 A1    Oct. 10, 2002

(51) Int. Cl.
*H04W 4/00* (2009.01)

(52) U.S. Cl. .................. 455/426.1; 455/432.1; 455/436; 455/437; 455/438; 455/439; 455/442; 455/443; 455/552.1; 455/553.1; 455/444; 370/310.2; 370/328; 370/331

(58) Field of Classification Search ............... 455/426.1, 455/426.2, 432.1, 435.1, 435.2, 436–444, 455/452.2, 552.1, 553.1, 554.2, 41.2, 41.3; 370/328, 331–334, 338, 401, 913
See application file for complete search history.

(56) References Cited

U.S. PATENT DOCUMENTS

| | | | | |
|---|---|---|---|---|
| 5,771,468 | A * | 6/1998 | Stein .............................. | 455/561 |
| 5,796,727 | A * | 8/1998 | Harrison et al. .............. | 370/338 |
| 5,930,241 | A * | 7/1999 | Fried ............................. | 370/328 |
| 5,953,667 | A * | 9/1999 | Kauppi ......................... | 455/440 |
| 5,956,629 | A * | 9/1999 | Morrison .................... | 455/166.2 |
| 5,961,607 | A * | 10/1999 | Schaefers ..................... | 709/249 |
| 6,211,841 | B1 * | 4/2001 | Smith et al. .................... | 343/813 |
| 6,230,017 | B1 * | 5/2001 | Andersson et al. ......... | 455/456.6 |
| 6,243,581 | B1 * | 6/2001 | Jawanda .................... | 455/432.2 |
| 6,275,706 | B1 * | 8/2001 | Rune .......................... | 455/456.1 |
| 6,289,221 | B1 * | 9/2001 | Ritter ............................. | 455/447 |
| 6,330,244 | B1 * | 12/2001 | Swartz et al. ................. | 370/401 |
| 6,332,077 | B1 * | 12/2001 | Wu et al. .................... | 455/432.1 |
| 6,363,255 | B1 * | 3/2002 | Kuwahara .................. | 455/456.5 |
| 6,408,184 | B1 * | 6/2002 | Kallio et al. .................. | 455/445 |
| 6,424,638 | B1 * | 7/2002 | Ray et al. ....................... | 370/331 |
| 6,639,904 | B1 * | 10/2003 | Boyer et al. .................. | 370/329 |
| 6,671,510 | B1 * | 12/2003 | Kelly et al. .................... | 455/445 |
| 6,882,844 | B1 * | 4/2005 | Keski-Heikkila ............. | 455/446 |

(Continued)

FOREIGN PATENT DOCUMENTS

EP    1207708    5/2002

(Continued)

OTHER PUBLICATIONS

"A Handoff Examination of a Hybrid System Using Cellular and Ad-Hoc Modes", Tomoko Adachi and Masao Nakagawa, IEICE Trans. Commun., vol. E83-B, No. 11, Nov. 2000.

*Primary Examiner* — Stephen M D'Agosta
(74) *Attorney, Agent, or Firm* — Harrington & Smith

(57) ABSTRACT

A network architecture for Wireless Intranet Office (WIO) applications including a local radio network such as a wireless local area network (WLAN) which comprises a Wireless Mobile Center (WMC) arranged to serve as a WLAN access point; a GSM network which comprises a Mobile Station (MS) in a form of a dual-mode cellular phone to access both WLAN and GSM radio technologies, a Base Station (BS) arranged to convert a radio signal from the Mobile Station (MS) for communication, a Mobile Switching Center (MSC) arranged to establish call connection; and a Handover Module implemented in either the Mobile Station (MS) or the Wireless Mobile Center (WMC) for providing seamless mobility between the GSM network and the wireless LAN, when the Mobile Station (MS) roams between the GSM network and the wireless LAN.

30 Claims, 5 Drawing Sheets

U.S. PATENT DOCUMENTS

| | | | |
|---|---|---|---|
| 6,925,074 B1 * | 8/2005 | Vikberg et al. | 370/338 |
| 2001/0031645 A1 * | 10/2001 | Jarrett | 455/552 |
| 2002/0049073 A1 * | 4/2002 | Bell | 455/552 |
| 2002/0085516 A1 | 7/2002 | Bridgelall | |

FOREIGN PATENT DOCUMENTS

| | | |
|---|---|---|
| WO | WO 00/16577 | 3/2000 |
| WO | WO 00/38465 | 6/2000 |
| WO | WO 01/58177 | 8/2001 |

\* cited by examiner

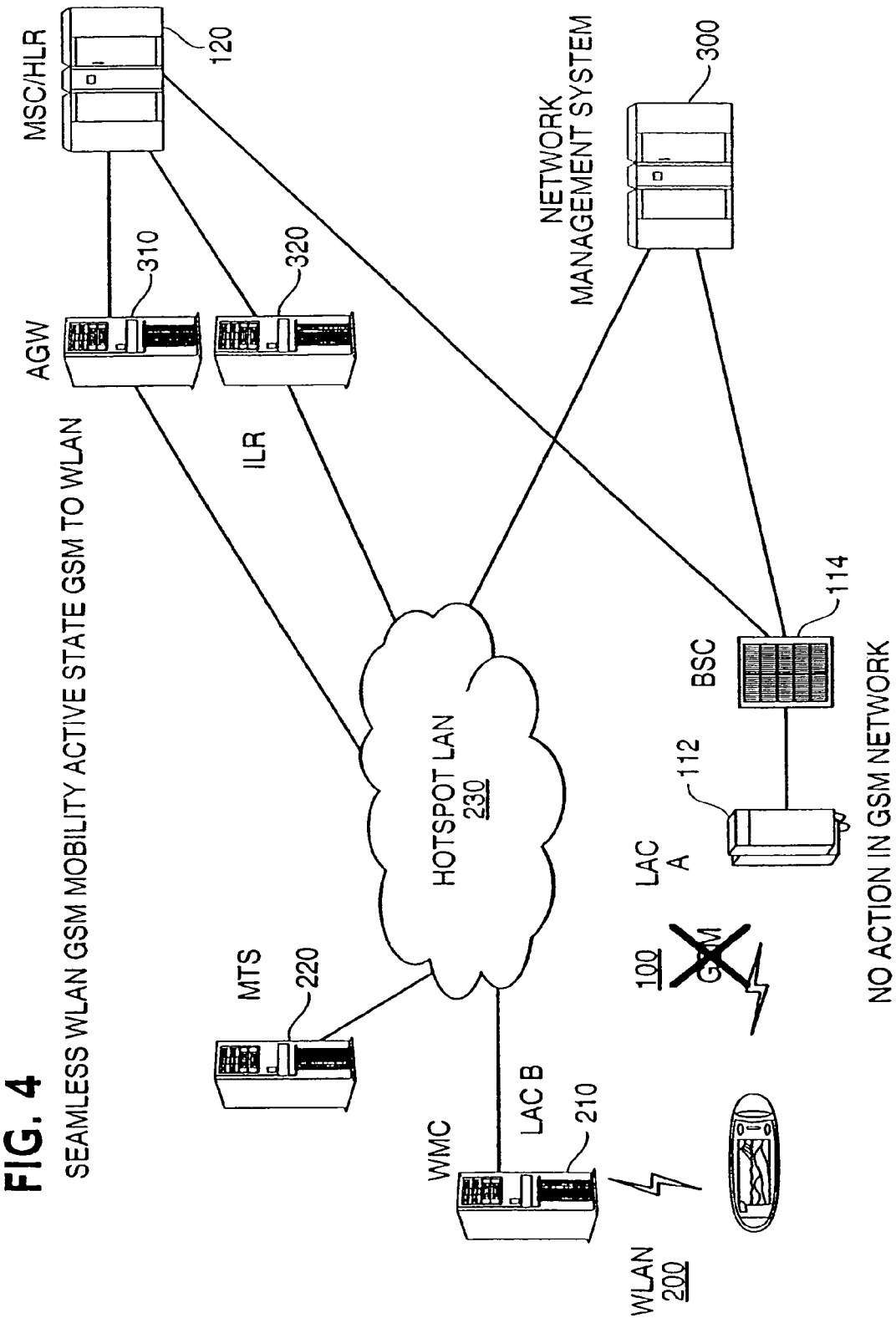
FIG. 4  SEAMLESS WLAN GSM MOBILITY ACTIVE STATE GSM TO WLAN

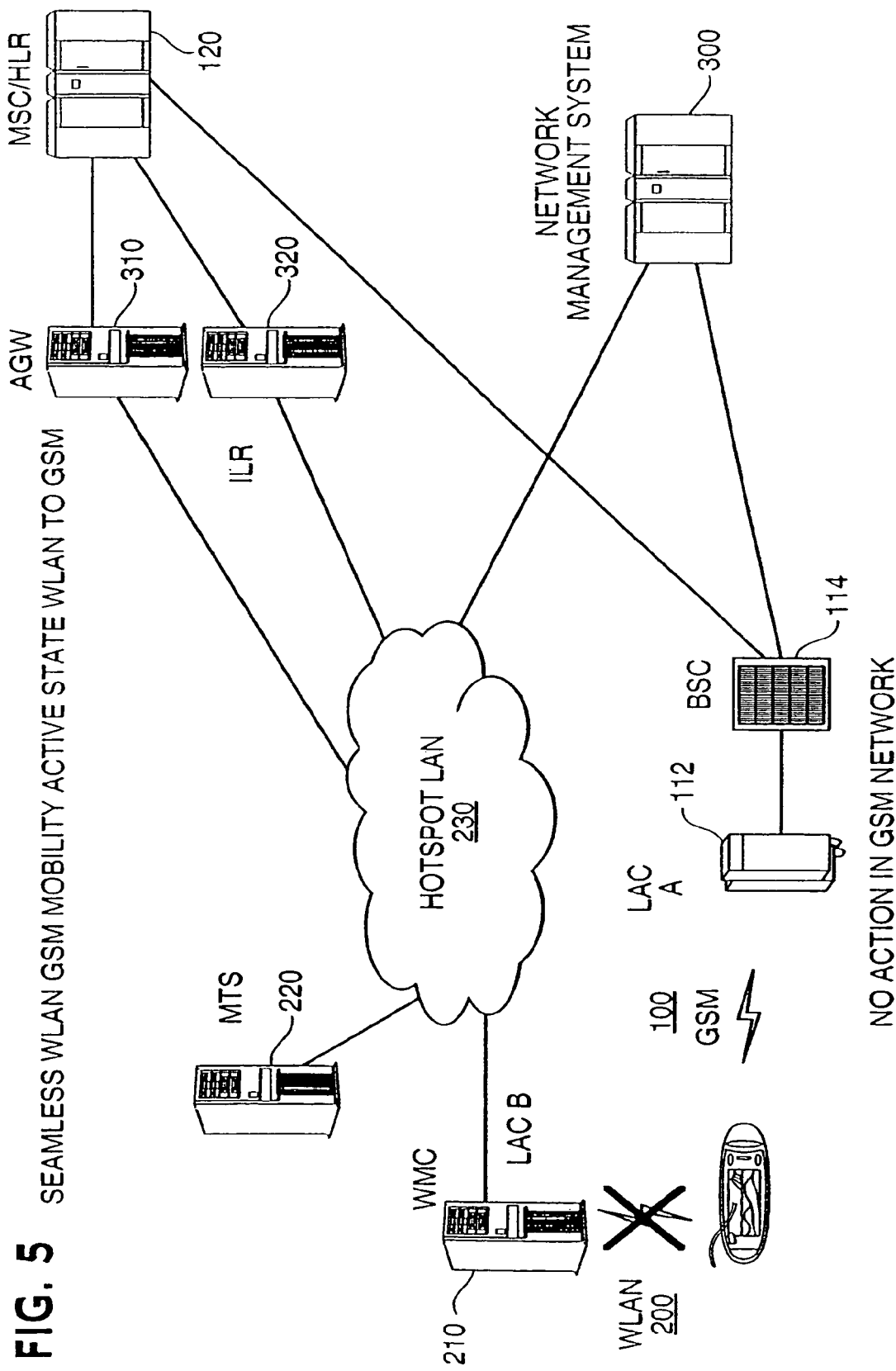
FIG. 5  SEAMLESS WLAN GSM MOBILITY ACTIVE STATE WLAN TO GSM

IDENTIFYING NEIGHBORING CELLS IN TELECOMMUNICATION NETWORK

BACKGROUND OF THE INVENTION

1. Technical Field

The present invention relates to digital cellular radio networks such as Global System for Mobile communication (GSM) networks, and more particularly, relates to solutions for providing seamless mobility between a GSM network and a different local radio network (e.g., wireless LAN), particularly when such local radio network is used in hotspot areas or an area where high bit rate or high quality of service (QoS) is desirable without having different terminals, devices and numbers.

2. Related Art

GSM networks represent digital cellular networks and personal communications systems which allow one network channel to support multiple conversations using time division multiple access (TDMA) technology. In those GSM networks, TDMA takes one network channel and divides it up into slices of time. The mobile phone user is given one of these slices of time for a brief pre-scheduled interval. The interval is so short that neither the mobile user nor other mobile users on the same radio channel notice that they are transmitting or receiving on a fraction of the channel. In this manner, the capacity of the network is significantly increased over standard analog cellular, which requires an entire channel for transmission.

GSM networks may be used on several different radio bands (also known as the frequency of the network), for example, standard 900 MHz (used mostly in original European GSM networks), 1800 MHz (used mostly in Personal Communications Networks/Digital Communication Systems PCN/DCS in the United Kingdom) and 1900 MHz (used mostly in Personal Communications System PCS in North America). GSM technical standards are provided by the European Telecommunications Standards Institute (ETSI) and can be obtained directly from ETSI via the web site: www.ETSI.fr.

Each GSM network is comprised of several major portions: a mobile phone, subscriber information, a radio network, a switching system and network intelligence (primarily databases). The mobile phone is called a mobile station which contains therein an electronic card, known as a subscriber identity module (SIM) to identify the user. Mobile stations communicate with nearby radio towers called base stations. Base stations convert the radio signal for communication to a switching system. The switching system connects calls to other mobile stations or routes the call to the public switched telephone network (PSTN) or other type of networks such as the public packet data network (PPDN) and the Internet. The switching system is connected to several databases that contain customer information to check authorization for services (e.g., voice, messaging, data and image services) and process call features.

Many GSM networks support the use of multi-mode, multi-frequency or multi-technology mobile stations that are capable of performing many advanced services. GSM mobile stations may combine many advanced services offered by GSM technology with the latest in computers, displays and other technologies. For example, multi-frequency GSM phones may allow a single handset to operate (roam) on GSM systems that have different frequencies, for example standard GSM (900 MHz), DCS (1800 MHz) or US PCS (1900 MHz). Multi-mode GSM phones may allow the same handset to access different radio technologies including Digital European Cordless Telephones (DECT). Multi-technology GSM phones may allow the handset to access and display different information sources (e.g., Internet web browsing).

However, there is still no seamless mobility between GSM networks and different radio networks such as, for example, wireless local area networks (WLAN), Bluetooth networks or 3G WCDMA radio networks. There is no way where a mobile station can roam from a GSM network to another radio network automatically and handover from and to another radio network to the GSM network successfully. In addition, there is no system where the same GSM mobile station can select to use another high capacity radio seamlessly in either an IDLE or ACTIVE mode while remaining accessible to other types of mobile stations, terminals or devices without any user actions.

Accordingly, there is a need for providing seamless mobility between a GSM network and a different local radio network, particularly when the local radio network is used in hotspot areas or an area where higher bit rate or high quality of service (QoS) is desirable without having different terminals, devices and numbers.

SUMMARY OF THE INVENTION

Accordingly, various embodiments of the present invention are directed to a network architecture for wireless applications such as Wireless Intranet Office (WIO) including a local radio network such as a wireless local area network (WLAN) which comprises a Wireless Mobile Center (WMC) arranged to serve as a WLAN access point; a cellular network such as a GSM network which comprises a Mobile Station (MS) in a form of a dual-mode cellular phone to access both WLAN and GSM radio technologies, a Base Station (BS) arranged to convert a radio signal from the Mobile Station (MS) for communication, a Mobile Switching Center (MSC) arranged to establish call connection; and a Handover Module implemented in either the Mobile Station (MS) or the Wireless Mobile Center (WMC) for providing seamless mobility between the GSM network and the wireless LAN, when the Mobile Station (MS) roams between the GSM network and the wireless LAN.

During an IDLE mode when the Mobile Station (MS) roams from the GSM network to the wireless LAN, the Mobile Station (MS) may be configured to select a WLAN radio, attempt a location update via the wireless LAN, and a new location of the Mobile Station (MS) may be updated at the Mobile Switching Center (MSC) of the GSM network.

During an ACTIVE handover mode when the Mobile Station (MS) initiates a handover from the GSM network to the wireless LAN, the Mobile Station (MS) may be configured to measure GSM neighbor cells, report a WLAN cell as an ordinary GSM cell, send measurement reports to the Base Station (BS), where the handover algorithm generates a handover request to the Mobile Switching Center (MSC) of the GSM network. The Mobile Station (MS) may then drop GSM neighbor cells from the list and send only "WLAN cell" information and/or drop the level of the measurement value of the serving cell so that the handover algorithm in the Base Station (BS) is "forced" to make a handover. In this case the GSM network serves as a source and the wireless LAN serves as a target.

Additionally, the handover algorithm in the Base Station (BS) may also contain special handover criteria for the played GSM cell upon detection from the measurement reports. For example, the Handover Module may request a handover when the played GSM cell rx-level (transmission level) exceeds a certain threshold, even though the serving cell rx-level is good and there are many good GSM neighbor cells. Another example is that the number (loss or rapid loss) of GSM neighbor cells from the measurement reports may be used as a criterion for the handover initiation towards the wireless LAN. This way the Mobile Station (MS) can remote command the time when the Base Station (BS) to start requesting the handover. For instance, the Mobile Station (MS) may drop off the GSM neighbor cells for a period of four measurement reports. At the same time, the Base Station (BS) may detect the number of GSM neighbor cells, when the played GSM cell is reported and the played GSM cell rx-level exceeds the threshold. After the four GSM measurement reports are received and the played GSM cell rx-level still exceeds the threshold, the handover is requested.

During an IDLE mode when the Mobile Station (MS) roams from said wireless LAN to said GSM network, the Wireless Mobile Center (WMC) may be configured to inform GSM neighbor cells, and the Mobile Station (MS) may be configured to select a GSM radio and attempt a location update via the GSM network, and a new location of the Mobile Station (MS) may be updated at the Mobile Switching Center (MSC).

During an ACTIVE handover mode when the Mobile Station (MS) initiates a handover from the wireless LAN to the GSM network, the Mobile Station (MS) may be configured to measure GSM neighbor cells, send measurement reports to the Wireless Mobile Center (WMC) of the wireless LAN, where the handover algorithm generates a handover request to the Mobile Switching Center (MSC), via the Wireless Mobile Center (WMC) of the wireless LAN. In this case the wireless LAN serves as a source and the GSM network serves as a target.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 4 illustrates an example seamless network mobility architecture in an ACTIVE state from a GSM network to a local radio network such as a wireless LAN according to an embodiment of the present invention; and FIG. 5 illustrates an example seamless network mobility architecture in an ACTIVE state from a local radio network such as a wireless LAN to a GSM network according to an embodiment of the present invention.

DETAIL DESCRIPTION OF EMBODIMENTS OF THE INVENTION

The present invention is applicable for use with all types of cellular networks including $2^{nd}$ and $3^{rd}$ generations of GSM networks, and local radio networks including wireless local area networks (WLAN), and interconnected systems and related protocols used for voice, message, data and image transfers between systems in such networks. For example, GSM networks include GSM 900, GSM 1800 and GSM 1900 (also known as PCS-1900). $3^{rd}$ generation GSM networks include data networks using General Packet Radio Service (GPRS) technology for mobile data networking services and personal multimedia services, and Enhanced Data Rates for Global Evolution (EDGE) technology for high bit rate data services. GPRS technology is used in GSM networks to enable users to connect at higher data rates and make applications such as wireless email and web-browsing easier and more useful. EDGE is used to further boost the data speeds and allow video and mobile multimedia applications with data rates as high as 473 kbps. BlueTooth networks and/or Wideband CDMA (hereinafter called 3G WCDMA) networks may be used in place of the wireless local area networks (WLAN). However, for the sake of simplicity, discussions will concentrate mainly on the seamless mobility between a GSM network and a WLAN network.

Figure 1:
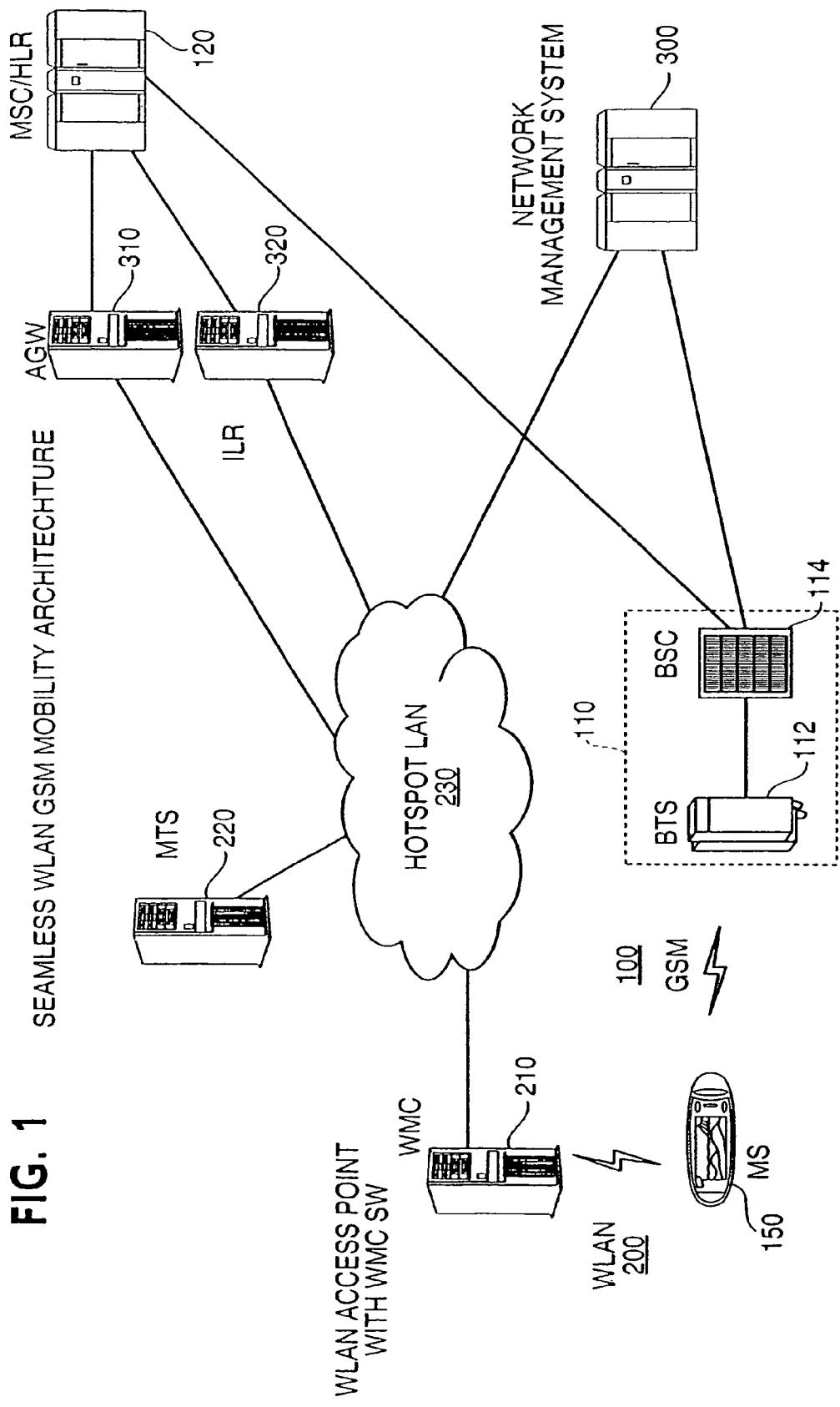
FIG. 1 illustrates an example seamless network mobility architecture for providing seamless mobility between a GSM network and a local radio network such as a wireless LAN according to an embodiment of the present invention.

Attention now is directed to the drawings and particularly to FIG. 1, an example seamless network mobility architecture for providing seamless mobility between a GSM network and a local radio network such as a wireless LAN according to an embodiment of the present invention is illustrated. Such a network system architecture may be utilized for wireless applications such as Wireless Intranet Office (WIO) applications and may, therefore, be broadly considered as an example WIO network. As shown in FIG. 1, the network system architecture is comprised of a GSM network 100 and a local radio network such as a wireless LAN (WLAN) 200 that are managed by a network management system 300. In addition, a Mobile Station (MS) 150 in a form of a Dual-Mode (or multi-mode) Mobile is also utilized to operate in two or more different radio technologies, for example, GSM technology and other hotspot radio technology such as a wireless LAN. Such a Mobile Station (MS) 150 serves as the user's interface with the GSM network 100 and the wireless LAN 200, and includes a removable Subscriber Identity Module (SIM) card or chip (not shown) which contains an authentication algorithm for confirming the identity of the user (customer) and information necessary to allow the user to roam in different coverage areas of different technologies, including the GSM network 100 and the wireless LAN 200. More importantly, the Mobile Station (MS) 150 may also contain a novel handover algorithm (handover module) according to an embodiment of the present invention for call handover (sometimes known as "handoff") and for providing seamless mobility between the GSM network 100 and the wireless LAN 200. Handover is a process which allows a conversation (or a call setup or message transmission) to continue even when the Mobile Station (MS) 150 moves from the radio coverage area of one cell (GSM cell or WLAN cell) to another (WLAN or GSM cell) in the midst of the communication.

Mobility between the GSM network 100 and the wireless LAN 200 may be characterized in two modes. An IDLE mode where the Mobile Station (MS) 150 roams from one radio network to another radio network, that is, between the GSM network 100 and the wireless LAN 200. An ACTIVE state handover mode where call handover (or "handoff") is controlled by the GSM network 100 and the wireless LAN 200.

The handover algorithm for providing seamless mobility between the GSM network 100 and the wireless LAN 200 according to an embodiment of the present invention may be activated during the IDLE mode; however, the ACTIVE mode handover may also be used. No change to the ETSI GSM specification is required.

The GSM network 100 comprises a Base Station Subsystem (BSS) 110 and a Network and Switch Subsystem (NSS) 120. The Base Station Subsystem (BSS) 110 includes a Base Transceiver Station (BTS) 112 having several base radio transceivers operable in different radio frequencies and a Base Station Controller (BSC) 114 having a control computer (typically a microprocessor with memory), data communication facilities, and multiplexing/de-multiplexing equipments arranged to coordinate the overall operation of the base station equipments, including controlling radio communication links. The Network and Switch Subsystem (NSS) 120 includes a Mobile Switching Center (MSC) having a switching center, power supplies and alarm monitoring equipments, and network databases including a Home Location Register (HLR) used in the GSM network 100 to check authorization for services including supports for roaming services and process call features. Home Location Register (HLR) may also be used to store various GSM location area codes (LAC) so that the location of the Mobile Station (MS) 150 may always be found at the HLR. LAC represents a code assigned by the system operator to identify the specific areas of operation. These LAC identifiers can be used to indicate region (groups of cells—GSM or WLAN cells) that are used to limit the geographical extent of paging or which have different billing codes or the types of authorized service features. For example, LAC A may be assigned to the Base Transceiver Station (BTS) 112 of the GSM network 100. Likewise, LAC B may be assigned to a similar WLAN access point of the wireless LAN 200. Other network databases may also be utilized as network resources. For example, a Visitor Location Register (VLR) may be used to hold temporary information about active subscribers that are operating within the control of that particular MSC 120. A Group Call Register (GCR) may be used to hold attributes for the set-up and processing of voice group and broadcast calls. A Short Message Control Center (SMCC) may be used to store and forward short messages to and from the GSM network 100. An Authentication Center (AuC) may be used to validate the identity of mobile stations. An Equipment Identity Register (EIR) may also be used to hold a list of unauthorized and suspect fraudulent users.

Typical interface types for the GSM network 100 may be used to establish connection between the Mobile Station (MS) 150, the Base Station Subsystem (BSS) 110, and the Mobile Switching Center (MSC) 120. For example, the radio (Um) interface may be used for radio interconnection between the Mobile Station (MS) 150 and the Base Transceiver Station (BTS) 112. The A-bis interface may be used for interconnection between the Base Transceiver Station (BTS) 112 and the Base Station Controller (BSC) 114. The A interface may be used for interconnection between the Base Station Controller (BSC) 114 and the Mobile Switching Center (MSC) 120. A and A-bis interfaces are usually embodied in a digital link via wire, optical fiber, or microwave radio, and use packet messages that conform to SS7 (Signaling System #7) connection protocols.

The wireless LAN 200 comprises a Wireless Mobile Center (WMC) 210, a Mobile Transaction Server (MTS) 220 and a hotspot LAN 230 that are connected to the GSM network 100, via a A-interface gate (AGW) 310 and an Intranet Location Register (ILR) 320 under the control of the network management system 300.

The WMC 210 may contain one or more mobile radio transceivers operable in different radio frequencies for radio and related functions, and other radio parameters that are used for controlling radio communication links and moving towards the GSM network 100, for example, based on power levels and needed thresholds for network change. WMC 210 may also include software such as an authentication algorithm for confirming the identity of the user (customer) and information necessary to allow the user to roam in different coverage areas of different technologies, including the GSM network 100 and the wireless LAN 200, and radio network databases configured by the same network management system 300 to store GSM neighbor information regarding to the GSM network 100 and GSM cell identity (frequency, Base Station identification, and GSM location area code "LAC") used for showing WLAN cell as a GSM cell towards the GSM network 100.

In addition, the WMC 210 may also contain a novel handover algorithm (handover module) according to an embodiment of the present invention for call handover and for providing seamless mobility between the GSM network 100 and the wireless LAN 200. If the handover algorithm is implemented as part of the WMC 210, the Mobile Station (MS) 150 may provide continuously information regarding the WLAN radio and the neighbor GSM cell rx-levels. The WMC 210 may, in turn, contain software and protocol stacks needed for providing the handover request and other handover messages. However, if the handover algorithm (module) is already implemented as part of the Mobile Station (MS) 150, then the handover algorithm (module) is not needed in the WMC 210. Software and protocol stacks needed for providing the handover request and other handover messages may not be required. The WMC 210 may only transfer handover and location update related messages towards the AGW 310 via the MTS 220, if the MTS 220 is used.

The MTS 220 may be arranged to control the wireless LAN 100 and operation of the WMC 210 and AGW 310, including Nokia RCP (Rich Call Platform) style local routing for voice calls that are needed. However, all MTS functions can be included in the WMC 210 or the AGW 310. Therefore, MTS 220 may be optional and not required by the wireless LAN 200.

The AGW 310 may include transcoding capabilities, if those are needed in voice calls, and serve only as signaling gateway. In addition, the AGW 310 may be arranged to transfer handover messages and location update related messages. For example, if call control is routed via AGW 310, then call control messages may also be routed via AGW 310.

Call protocols used for the wireless LAN 200 needs not be the same as call protocols used for the GSM network 100. For example, H323 Voice over IP standard ITU-T H-series protocols and/or SIP (Session Initiation Protocol IETR RFC 2543) protocols may be used for the GSM network 100 and the wireless LAN 200. If both H323 and SIP call signaling protocols are used, the handover from the GSM network 100 to the wireless LAN 200 or vice versa may be more complicated and some types of protocol conversions may be required. During the handover, the Mobile Station (MS) 150 may adapt the different call control protocol.

If roaming is only executed during an IDLE state, only location update related messages need to support and the use of different call setups and handling protocols in the GSM and WLAN networks does not affect the AGW 310.

Figure 2:
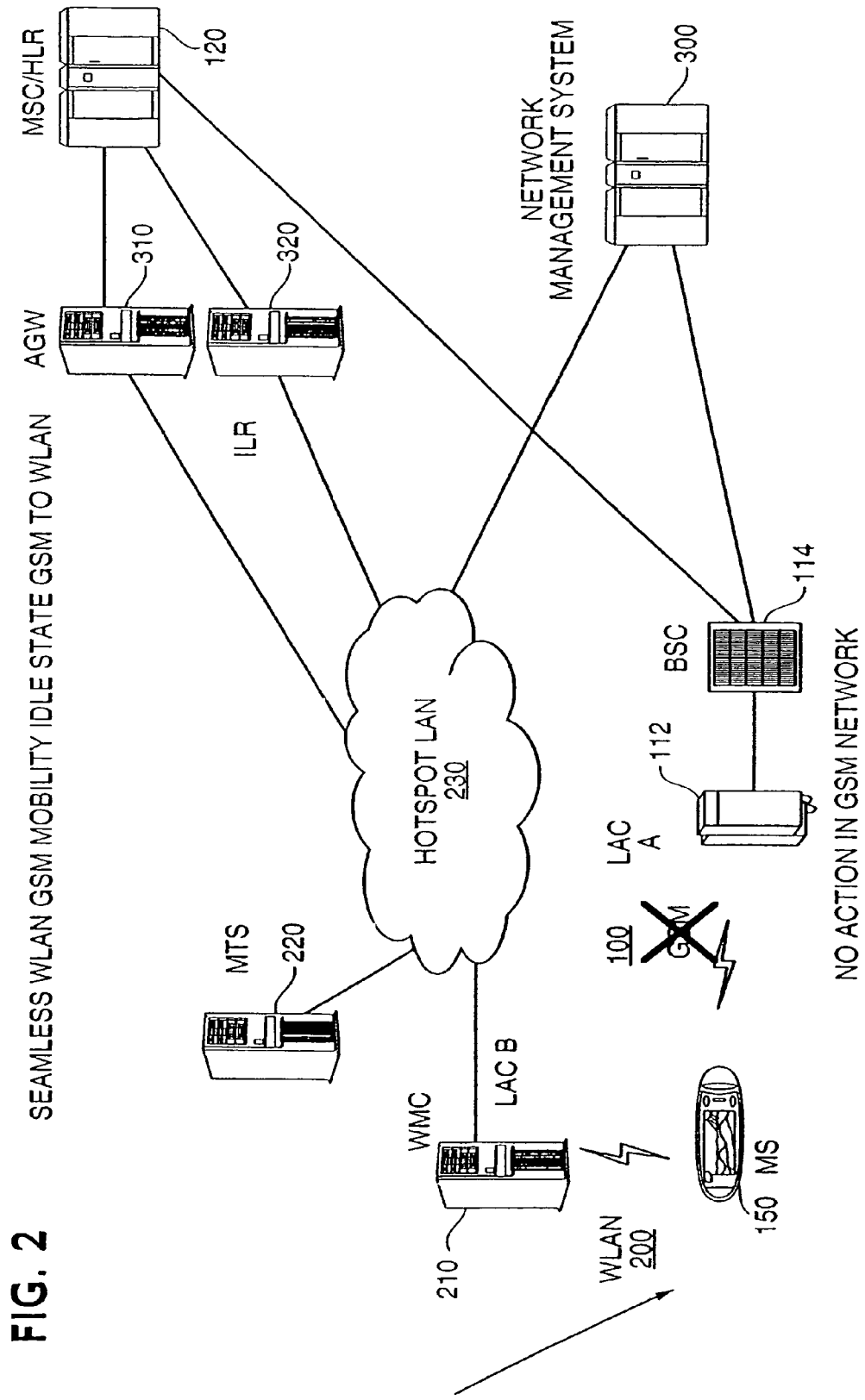
FIG. 2 illustrates an example seamless network mobility architecture in an IDLE state from a GSM network to a local radio network such as a wireless LAN according to an embodiment of the present invention.

Turning now to FIGS. 2-5, an example seamless network mobility architecture in an IDLE state or an ACTIVE state from a GSM network 100 to a local radio network such as a wireless LAN 200 or from a wireless LAN 200 to a GSM network 100 according to an embodiment of the present invention are illustrated. Specifically, FIG. 2 illustrates an example seamless network mobility architecture in an IDLE state from a GSM network 100 to a wireless LAN 200 according to an embodiment of the present invention. During an IDLE mode, the Mobile Station (MS) 150 is first camped in a GSM network 100 and measures GSM neighbors and other radio so as to determine, via a GSM radio, base station identification information regarding to a WLAN cell like an ordinary GSM cell. The WLAN cell broadcasts GSM cell information messages continuously or only when new Mobile Station or new device attempts to make contact via the wireless LAN 200.

When entering the wireless LAN 200, the Mobile Station (MS) 150 first establishes communication with the wireless LAN 200 and receives the above played GSM cell information messages. If the GSM cell information matches the neighbor information given by serving the GSM cell and, if the WLAN rx-level (transmission level) thresholds comparison indicates that the WLAN cell should be selected, the Mobile Station (MS) 150 makes a location update attempt, via the wireless LAN 200 and particularly, via WMC 210. Otherwise, no location update attempt is made. If the location update is accepted (location area change), the Mobile Station (MS) 150 selects the wireless LAN 200 and disconnects the GSM network 100. New location area is updated and stored in the MSC/BLR 120. No action is required in the GSM network 100.

At this point if WLAN rx-level thresholds comparison indicates that the WLAN cell should be selected, the WMC 210 delivers the GSM neighbor information to the Mobile Station (MS) 150 and the Mobile Station (MS) 150 starts or continues measuring the GSM neighbors and roaming from a GSM network 100 to a wireless LAN 200.

Figure 3:
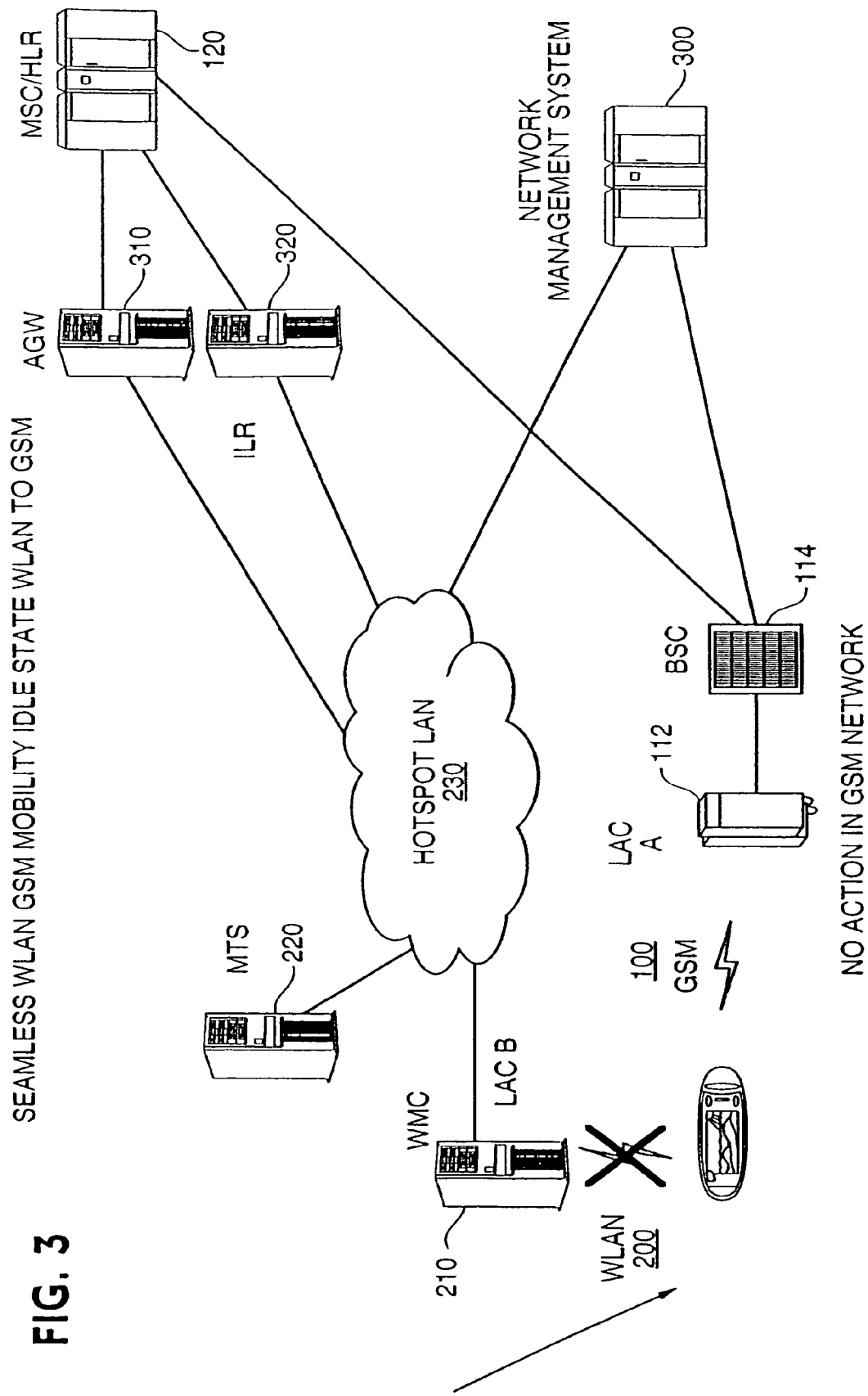
FIG. 3 illustrates an example seamless network mobility architecture in an IDLE state from a local radio network such as a wireless LAN to a GSM network according to an embodiment of the present invention.

A sequence of seamless WLAN GSM mobility of the example WIO network from a GSM network 100 to a wireless LAN 200 during an IDLE mode may be summarized as follows:

FIG. 3 illustrates an example seamless network mobility architecture in an IDLE state from a wireless LAN 200 to a GSM network 100 according to an embodiment of the present invention. During an IDLE mode, the Mobile Station (MS) 150 is first camped in a wireless LAN 200 but still measures GSM neighbors and other radio so as to determine, via WMC 210, base station identification information regarding to a GSM cell.

When entering the GSM network 100, the Mobile Station (MS) 150 first establishes communication with the GSM network 100 and receives the GSM cell information messages. If the GSM cell information matches the neighbor information given by serving the GSM cell and, if the WLAN rx-level (transmission level) thresholds comparison indicates that the GSM cell should be selected, the Mobile Station (MS) 150 makes a location update attempt, via the GSM network 100. Otherwise, no location update attempt is made. If the location update is accepted (location area change), the Mobile Station (MS) 150 selects the GSM network 100 and disconnects the wireless LAN 200. New location area is updated and stored in the MSC/HLR 120. No action is required in the GSM network 100.

At this point, if WLAN rx-level thresholds comparison indicates that the GSM cell should be selected, the WMC 210 delivers the GSM neighbor information to the Mobile Station (MS) 150 and the Mobile Station (MS) 150 starts or continues measuring the GSM neighbors and roaming from a wireless LAN 200 to a GSM network 100.

A sequence of seamless WLAN GSM mobility of the example WIO network from a wireless LAN 200 to a GSM network 100 during an IDLE mode may be summarized as follows:

| MS 150 | WMC 210 |
|---|---|
| 1) MS 150 camps on GSM network 100. | |
| 2) MS 150 measures WLAN, when WLAN rx-level acceptable. | |
| | 3) WMC 210 sends GSM neighbor information to MS 150 and MS 150 sees WLAN cell as GSM cell. |
| 4) MS 150 attempts location update. | |
| | 5) For WIO user, location update is accepted. For non-WIO user, location update is rejected, and MS 150 stays camped on GSM network 100. |
| 6) If location update is accepted, MS 150 is camped on WLAN 200 and measures informed GSM neighbors by WMC 210 | |
| 7) MS 150 is ready to make a call or data. | |

| MS 150 | WMC 210 |
|---|---|
| 1) MS 150 camps on wireless LAN 200. | Wireless LAN 200 informs GSM neighbors. |
| 2) MS 150 measures WLAN all time and informed GSM neighbors. | |
| 3) WLAN rx-level drops below limit-MS 150 decides to camp on GSM network 100 Number of variables are used to calculate access changes, penalty times etc. | |
| 4) MS 150 makes location update with GSM network 100. | |

FIG. 4 illustrates an example seamless network mobility architecture in an ACTIVE handover state from a GSM network to a local radio network such as a wireless LAN according to an embodiment of the present invention. In this example, the GSM network 100 serves as a source and the wireless LAN 200 serves as a target. During an ACTIVE mode, the Mobile Station (MS) 150 has an ongoing call via GSM cell. During the call, the Mobile Station (MS) 150 measures GSM neighbors but also other radio so as to determine, via a GSM radio, base station identification information informed by the GSM Base Station Subsystem (BSS) 110 regarding to a WLAN GSM played cell like an ordinary GSM cell (reserved frequency in GSM band). The WLAN cell broadcasts GSM cell information messages continuously or only when new Mobile Station or new device attempts to make contact via the wireless LAN 200.

It should be noted here that one or more GSM frequency numbers for a wireless LAN 200 should be reserved by an operator. Reserved GSM frequency numbers are used as representation of WLAN cell towards a GSM network 100 when the Mobile Station (MS) 150 measures a neighbor network while in a GSM network 100. Reserved GSM frequency numbers may be provided to the Mobile Station (MS) 150 in ACTIVE state neighbor during a call via the servicing cell. This way the Mobile Station (MS) 150 may use a reserved GSM frequency as a representation of a WLAN cell, and start to report this GSM frequency in the measurement reports. The handover algorithm (module) of the GSM network 100 can then make a handover request towards a cell providing this GSM frequency, but actually towards in a WLAN cell.

The same GSM frequency may also be used also during an IDLE mode, where the serving GSM cell can inform the Mobile Station (MS) 150 that this reserved GSM frequency belongs to the IDLE state neighbor cells. In both cases it is important that the reserved GSM frequency is not used in real GSM network 100.

When entering the wireless LAN 200, the Mobile Station (MS) 150 first establishes communication with the wireless LAN 200 and receives the above played GSM cell information messages. If the GSM cell information matches the neighbor information given by serving the GSM cell and, if the GSM rx-level (transmission level) thresholds comparison indicates the match, the Mobile Station (MS) 150 adds this played GSM frequency to measurement reports. The GSM rx-level threshold value for this played GSM cell and for the measurement report is calculated by the Mobile Station (MS) 150. Different parameters may also be used for calculation. The wireless LAN 200 can send these additional parameters in the same messages where the played GSM cell information is indicated.

If the GSM network 100 is good, but the Mobile Station (MS) 150 still wants to make a handover towards the wireless LAN 200, the Mobile Station (MS) 150 may drop GSM cells from the measurement reports or decrease the measured rx-level of the listed GSM neighbors so that a handover algorithm installed in the GSM Base Station Subsystem (BSS) 110 will likely to indicate the need for a handover and start the handover procedure. The Mobile Station (MS) 150 may also drop the measured rx-level of the serving cell to "force" the handover algorithm installed in the GSM Base Station Subsystem (BSS) 110 to make a handover.

In addition, when the Mobile Station (MS) 150 is in the wireless LAN 200, the WLAN rx-level (transmission level) may contain two threshold values. If the WLAN rx-level is higher than the upper threshold value, the Mobile Station (MS) 150 may switch OFF the GSM side to save battery. If the WLAN rx-level drops between the two threshold values, the Mobile Station (MS) 150 may start measure the GSM neighbor cells again.

When the handover algorithm installed in the GSM Base Station Subsystem (BSS) 110 indicates the need for a handover, a handover request is sent towards the MSC 120 and then delivered to the WMC 210, via AGW 310.

If the WMC 210 is capable of handling the handover request, the WMC 210 will send a handover request acknowledgment message and the handover procedure will continue. After the handover request acknowledgment message, the MSC 120 will handle the handover procedure and send a handover command to the Mobile Station (MS) 150, via GSM Base Station Subsystem (BSS) 110. The Mobile Station (MS) 150 will then contact the WLAN radio and send handover access or directly handover detect-message, via the wireless LAN 200 and AGW 310, to the MSC 120. After the handover complete message is sent to the MSC 120, the MSC 120 will release the reserved resources from the GSM Base Station Subsystem (B SS) 110 for the call and the call is now in the wireless LAN 200. The Mobile Station (MS) 150 is handed over and starts to use the WLAN radio.

The AGW 310 may play some roles in the GSM handover messaging. This is because in the wireless LAN side the handover target cell role can be handled by only one message meaning handover detected and completed, corresponding three messages in the GSM Base Station Subsystem (BSS) 110: Access, Detection and Completion. The AGW 310 may act as the GSM Base Station Subsystem (BSS) 110 towards the MSC 210 to generate the needed three messages in a form of a single message. However, exceptions may be taken into account, for example, in cases where the Mobile Station (MS) 150 may be lost during handover or either GSM network 100 or wireless LAN 200 can began non-operable during a handover.

A sequence of seamless WLAN GSM mobility of the example WIO network from a GSM 100 to a wireless LAN 200 during an ACTIVE mode may be summarized as follows:

| MS 150 | GSM BSC 114 | WMC 210 |
|---|---|---|
| 1) MS 150 measures GSM neighbors. 3) WLAN rx-level rises over limit, WLAN cell is ranked first in measurement report. | 2) BSC 114 receives measurement results. 4) BSC 114 indicates handover to WLAN cell. | |
| | 5) Handover begins. | 6) WMC 210 receives handover attempt. |
| 7) MS 150 is handed over to WLAN 100 and starts to use WLAN radio. | | |
| | | 8) GSM neighbors are sent to MS 150. |
| 9) MS 150 measures WLAN neighbors and informed GSM neighbors. | | |
| | | 10) Handover algorithm is started. |

FIG. 5 illustrates an example seamless network mobility architecture in an ACTIVE handover state from a wireless LAN 200 to a GSM network 100 according to an embodiment of the present invention. In this example, the wireless LAN 200 serves as a source and the GSM network 100 serves as a target. During an ACTIVE mode, the Mobile Station (MS) 150 has an ongoing call via a wireless LAN 200. During the call, the Mobile Station (MS) 150 still measures GSM neighbors continuously but also other radio so as to determine, via WMC 210, base station identification information regarding to a GSM cell.

If the handover algorithm (module) is implemented as part of the Mobile Station (MS) 150, then the Mobile Station (MS) 150 will determine the need for a handover. In this case, the Mobile Station (MS) 150 sends a handover request to the MSC 120, via the WMC 210 and AGW 310, with a target cell list calculated from the neighbor cell list, when the WLAN rx-level thresholds comparison indicates for such request or some other reasons.

If, on the other hand, the handover algorithm (module) is implemented as part of the WMC 210, then the WMC 210 will determine the need for a handover. In this case, the Mobile Station (MS) 150 sends measurement reports to the handover algorithm (module) installed in the WMC 210. The handover module installed in the WMC 210 then requests a handover by sending handover required-message towards the MSC 120, via AGW 310, with a target cell list calculated from the neighbor cell list.

When either the Mobile Station (MS) 150 or the WMC 210 indicates the need for a handover, the handover required-message is sent towards the MSC 120 and the handover request is sent from the MSC 120 to the GSM Base Station Subsystem (BSS) 110.

If the GSM Base Station Subsystem (B SS) 110 is capable of handling the handover request, the GSM Base Station Subsystem (BSS) 110 will send a handover request acknowledgment message and the handover procedure will continue. After the handover request acknowledgment message, the MSC 120 will handle the handover procedure and send a handover command to the Mobile Station (MS) 150, via the AGW 310 and WMC 210.

The Mobile Station (MS) 150 will then try to access the GSM Base Station Subsystem (BSS) 10. When the GSM Base Station Subsystem (BSS) 110 recognizes the handover access from the Mobile Station (MS) 1500, the GSM Base Station Subsystem (BSS) 110 sends handover detect-message towards the MSC 120. After the handover complete message is sent to the MSC 120, the MSC 120 will release the reserved resources from the WMC 210 for the call and the call is now in the GSM network 100. The Mobile Station (MS) 150 is handed over and starts to use the GSM radio.

The AGW 310 may play some roles in the GSM handover messaging. This is because in the wireless LAN side the handover target cell role can be handled differently. However, exceptions may be taken into account, for example, in cases where the Mobile Station (MS) 150 may be lost during handover or either GSM network 100 or wireless LAN 200 can began non-operable during handover.

A sequence of seamless WLAN GSM mobility of the example WIO network from a wireless LAN 200 to a GSM 100 during an ACTIVE mode may be summarized as follows:

| MS 150 | WMC 210 | GSM BSC 114 |
|---|---|---|
| 1) MS 150 measures WLAN neighbors and informed GSM neighbors. 2) MS 150 indicates WLAN rx-level to be under limit. | | |
| | 3) GSM handover algorithm calculates the best GSM target cell. 4) WMC 210 starts handover. | |
| 5) MS 150 starts handover to GSM network 100. | | |
| | | 6) BSC 114 receives handover attempt. |

| MS 150 | WMC 210 | GSM BSC 114 |
|---|---|---|
| 7) MS 150 is handed over to GSM network 100. | | |
| | 8) GSM neighbors are sent to MS 150. 9) Handover algorithm is started. | |

As described from the foregoing, the example WIO network according to different embodiments of the present invention provides seamless mobility between a GSM network and another local radio network such as a wireless LAN, particularly when such a wireless LAN is used in hotspot areas or an area where higher bit rate or high quality of service (QoS) is desirable without having different terminals, devices and numbers.

While there have been illustrated and described what are considered to be preferred embodiments of the present invention, it will be understood by those skilled in the art that various changes and modifications may be made, and equivalents may be substituted for elements thereof without departing from the true scope of the present invention. Further, many modifications may be made to adapt a particular situation to the teachings of the present invention without departing from the central scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus, comprising:
    at least one processor; and
    at least one memory including computer program code, where the at least one memory and the computer program code are configured, with the at least one processor, to cause the apparatus to at least:
    identify an access point of a first telecommunication network as being a neighbor cell to a second telecommunication network by transmitting identity information for the access point of the first telecommunication network to a mobile station, the transmitted identity information using a cell identity information structure of the second telecommunication network, wherein the first telecommunication network is a different radio technology than the second telecommunication network and wherein the transmitted identity information comprises a location area code associated with the second telecommunication network;
    dependent upon at least part of the transmitted identity information matching information given to the mobile station by a cell serving the mobile station, receive, from the mobile station, monitoring and measurement information associated with different radio technologies of at least the first telecommunication network and the second telecommunication network; and
    receive a modified measurement result which forces the first or the second telecommunication network to change the cell serving the mobile station.

2. The apparatus as claimed in claim 1, wherein the apparatus is the access point of the first telecommunication network.

3. The apparatus as claimed in claim 2, wherein the apparatus is the access point of the first telecommunication network controlling the neighbor cell of the second telecommunication network.

4. The apparatus as claimed in claim 1, wherein the second telecommunication network is a global system for mobile communications network.

5. The apparatus as claimed in claim 1,
    wherein the identity information further comprises a frequency, and a base station identification.

6. The apparatus as claimed in claim 1, in which the at least one memory including the computer program code is configured, with the at least one processor, to cause the apparatus to use a handover algorithm that provides seamless mobility between the first telecommunication network and second telecommunication network.

7. The apparatus as claimed in claim 6, wherein the seamless mobility is provided when a mobile station is in an idle mode.

8. The apparatus of claim 1, wherein the first telecommunication network is a wireless local area network or a Bluetooth network.

9. The apparatus of claim 1, wherein the first telecommunication network is a wideband CDMA network and the second telecommunication network is a GSM network.

10. The apparatus of claim 1, further comprising:
    a data store configured to store the cell identity information for the cell of the first telecommunication network using the cell identity information structure of the second telecommunication network.

11. A method, comprising:
    transmitting, from a transmitter of a cell of a second telecommunication network, cell identity information to a mobile station, wherein the cell identity information is of a cell of a first telecommunication network and is transmitted from the transmitter using a cell identity information structure of the second telecommunication network;
    providing, by a processor of the cell of the second telecommunication network, seamless mobility for the mobile station handing over between the first telecommunication network and the second telecommunication network, wherein the first telecommunication network is a different radio technology than the second telecommunication network, and wherein the transmitted cell identity information comprises a location area code associated with the second telecommunication network;
    dependent upon at least part of the transmitted cell identity information matching information given to the mobile station by a cell serving the mobile station, receiving, from the mobile station, monitoring and measurement information associated with different radio technologies of at least the first telecommunication network and the second telecommunication network; and receiving a modified measurement result which forces the first or the second telecommunication network to change the cell serving the mobile station.

12. The method as claimed in claim 11, wherein the cell identity information is stored in a neighbor list of neighboring cells and is stored at the cell of the first telecommunication network, in which the neighboring cells are of the second telecommunication network.

13. The method as claimed in claim 12, wherein the cell identity information of the cell of the first telecommunication network includes neighbor information transmitted by the transmitter of the cell of the second telecommunication network.

14. The method of claim 11, wherein the first telecommunication network is a wireless local area network or a Bluetooth network.

15. The method of claim 11, wherein the first telecommunication network is a wideband CDMA network and the second telecommunication network is a GSM network.

16. An apparatus, comprising:
at least one processor; and
at least one memory including computer program code, where the at least one memory and the computer program code are configured, with the at least one processor, to cause the apparatus to at least:
wirelessly communicate with a first telecommunication network and a second telecommunication network;
wirelessly receive cell identity information for a cell of the first telecommunication network using a cell identity information structure of the second telecommunication network, wherein the first telecommunication network is a different radio technology than the second telecommunication network and wherein the received cell identity information comprises a location area code associated with the second telecommunication network;
dependent upon at least part of the received identity information matching information given to the apparatus by a cell serving the apparatus, wirelessly transmit monitoring and measurement information associated with different radio technologies of at least the first telecommunication network and the second telecommunication network; and
modify a measurement result to force the first or the second telecommunication network to change the serving cell.

17. The apparatus as claimed in claim 16, further comprising:
the apparatus is further caused to measure a signal level of radio transmitters in the first telecommunication network and the second telecommunication network.

18. The apparatus as claimed in claim 17, in which the cell identity information for the cell of the first telecommunication network is received as a part of neighbor information of a cell of the second telecommunication network from which the receiver received the cell identity information.

19. The apparatus as claimed in claim 16, wherein the second telecommunication network is a global system for mobile communications network.

20. The apparatus as claimed in claim 16, wherein the cell identity information for the cell of the second telecommunication network comprises one or more of a frequency, a base station identification, and a location area.

21. The apparatus as claimed in claim 16, wherein the apparatus is embodied in a mobile station and the at least one memory including the computer program code is configured, with the at least one processor, to cause the apparatus to transmit an indication of received signal level to at least one of the first telecommunication network and the second telecommunication network.

22. The apparatus as claimed in claim 16, wherein the cell identity information for the cell of the first telecommunication network is received from the second telecommunication network.

23. The apparatus of claim 16, wherein the first telecommunication network is a wireless local area network or a Bluetooth network.

24. The apparatus of claim 16, wherein the first telecommunication network is a wideband CDMA network and the second telecommunication network is a GSM network.

25. A method, comprising:
wirelessly communicating, by a transmitter, with a first telecommunication network and a second telecommunication network;
wirelessly receiving from a cell of the first telecommunication network, at a receiver, cell identity information for the cell of the first telecommunication network using a cell identity information structure of the second telecommunication network, wherein the first telecommunication network is a different radio technology than the second telecommunication network and wherein the received identity information comprises a location area code associated with the second telecommunication network; and
dependent upon at least part of the received identity information matching information given by a serving cell, wirelessly transmitting monitoring and measurement information associated with different radio technologies of at least the first telecommunication network and the second telecommunication network, wherein the method is executed by a mobile station which is configured to modify a measurement result to force the first or the second telecommunication network to change the serving cell.

26. The method as claimed in claim 25, further comprising:
measuring at least at the receiver a signal level of radio transmitters in the first telecommunication network and the second telecommunication network.

27. The method as claimed in claim 26, wherein the received cell identity information is a part of neighbor information of a cell of the second telecommunication network.

28. The method as claimed in claim 25, wherein the second telecommunication network is global system for mobile communications network and the first telecommunication network is one of a wideband CDMA network, a wireless local area network, and a Bluetooth network.

29. The method as claimed in claim 25, wherein the cell identity information further comprises a frequency and a base station identification.

30. The method as claimed in claim 25, wherein the mobile station is configured to transmit a signal level to at least one of the first telecommunication network and the second telecommunication network.

* * * * *